United States Patent
Monson et al.

(10) Patent No.: US 6,533,258 B2
(45) Date of Patent: Mar. 18, 2003

(54) BARREL ELASTOMER MOUNT

(75) Inventors: Robert James Monson, St. Paul, MN (US); Scott J. Benjamin, Lakeville, MN (US); Jianhua Yan, Prior Lake, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/779,241

(22) Filed: Feb. 8, 2001

(65) Prior Publication Data

US 2002/0105123 A1 Aug. 8, 2002

(51) Int. Cl.[7] .................................................. F16F 1/36
(52) U.S. Cl. ...................... 267/153; 267/141; 267/141.4
(58) Field of Search ............................ 267/140.11, 153, 267/152, 141, 141.2, 141.4, 141.6, 136, 292

(56) References Cited

U.S. PATENT DOCUMENTS

| | | | |
|---|---|---|---|
| 3,409,284 A | * 11/1968 | Rix | 267/153 |
| 3,563,525 A | 2/1971 | Narabu | 267/140 |
| 4,053,148 A | * 10/1977 | Chalmers | 267/153 X |
| 4,059,254 A | 11/1977 | Fielding-Russel et al. | 276/140 |
| 4,601,611 A | 7/1986 | Tagomori | 405/215 |
| 5,199,690 A | * 4/1993 | Marshall | 267/64.25 |
| 5,280,890 A | * 1/1994 | Wydra | 267/220 |
| 5,482,260 A | * 1/1996 | Schmidt | 267/141 |
| 5,766,720 A | 6/1998 | Yamagishi et al. | 428/71 |
| 5,868,384 A | * 2/1999 | Anderson | 267/141.1 |
| 5,988,609 A | * 11/1999 | Young | 267/140 |
| 6,220,585 B1 | * 4/2001 | Heron | 267/153 |

* cited by examiner

Primary Examiner—Jack Lavinder
(74) Attorney, Agent, or Firm—Patrick M. Hogan; Glenn W. Bowen

(57) ABSTRACT

A barrel elastomer mount having a first hollow frustum composed of an elastomer and having a first end and a second end with the first end of the first hollow frustum having an interior diameter larger than an external diameter of the second end of the first hollow frustum; and a second hollow frustum composed of an elastomer having a first end and a second end with the first end of the second hollow frustum having an interior diameter larger than an external diameter of the second end of the second hollow frustum. The first hollow frustum is securely attached to the second hollow frustum at the first end of the first hollow frustum and at the first end of the second hollow frustum creating an enclosed cavity whereby the walls of the elastomer mount provide tension and shear resistance to shock and vibrational forces as well as to compressive static forces.

15 Claims, 4 Drawing Sheets

BARREL ELASTOMER MOUNT

FIELD OF INVENTION

This invention relates generally to shock isolators and more specifically to a barrel elastomer mount that provides compressive support to an article while attenuating shock and vibrational forces through shear and tension forces within the elastomer.

BACKGROUND OF THE INVENTION

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,766,720. These elastomeric isolators are typically attached to a housing to protect equipment within the housing from the effects of shock and vibration.

The prior art elastomeric isolators are generally positioned to rely on an axial compression of the elastomeric material or on tension or shear of the elastomeric material. Generally, if the elastomeric isolator is positioned in the axial compressive mode the ability of the elastomeric isolator to attenuate shock and vibration is limited by the compressive characteristics of the material. On the other hand, in the axial compressive mode the elastomeric isolators can be used to provide static support to a housing, which allows a single elastomeric isolator to be placed beneath the housing to support the static weight of the housing.

In general, if the elastomeric isolators are positioned in the shear or tension mode as opposed to an axial compression mode the elastomeric isolators provide better shock and vibration attenuating characteristics in response to dynamic forces due to shock and vibration. Unfortunately, elastomeric isolators, which operate in a shear or tension mode or in the axial compression mode, can generally not be placed beneath a housing to provide static support to the housing without substantially effecting the shock and vibration attenuation characteristics of the elastomeric isolators. Consequently, to provide static support for a housing, as well as effective shock and vibration attenuation characteristics the elastomeric isolators, which operate in the shear or tension mode, are generally placed along side or above a housing so that the elastomeric isolators can function in a shear or tension mode while supporting the static weight of the housing. The positioning in a shear or tension mode can require placing matching elastomeric isolators on each side of the housing. In contrast, the present invention provides an elastomeric isolator that provides axial offset compressive support for a housing. As the present invention does not require paring with other elastomeric isolators a single elastomeric isolator can be placed beneath a housing to provide static support for the housing through an axial offset compressive axis while at the same time allowing the elastomeric isolator to retain the necessary dynamic attenuation characteristics to thereby effectively reduce shock and vibration to the housing.

SUMMARY OF THE INVENTION

Briefly, the invention comprises a barrel elastomer mount to create an offset in the compression path through the mount. The barrel elastomer mount is composed of an elastomeric material and has a first end and a second end with a side wall located between the first end and the second end of the barrel elastomer mount. The side wall of the barrel elastomer mount extends outwardly from the center of the barrel with the horizontal midpoint of the side wall extending radially outward sufficiently far to prevent the wall of the barrel elastomer mount from buckling while simultaneously attenuating dynamic forces applied to the mount.

DESCRIPTION OF THE PREFERRED EMBODIMENT

Figure 1:
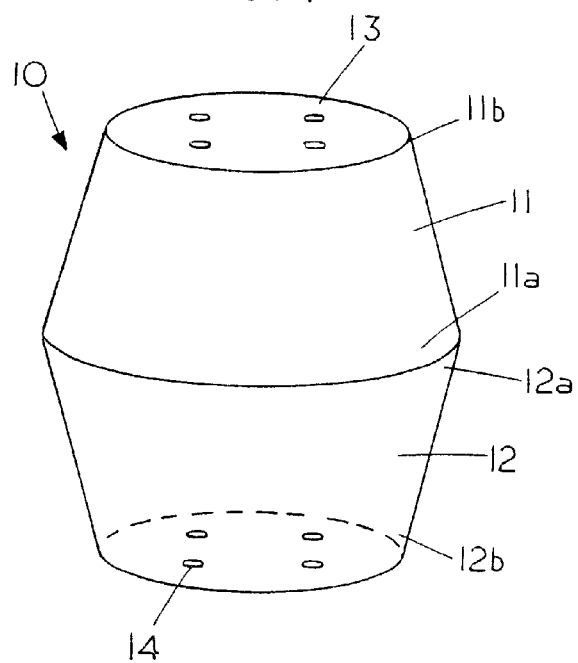
FIG. 1 shows a perspective view of a barrel elastomer mount of the present invention.

Referring to FIG. 1, reference numeral 10 generally identifies a barrel elastomer mount of the present invention for supporting a housing member such as a cabinet and attenuating the forces of various shocks and vibrations. Reference numeral 11 identifies a first hollow frustum composed of an elastomer such as rubber, plastic, or polyvinyl and having a first end 11a and a second end 11b. The internal diameter of the first end 11a of first hollow frustum 11 is larger than the external diameter of the second end 11b of first hollow frustum 11. Securely attached to first hollow frustum 11 is a second hollow frustum 12 composed of an elastomer such as rubber, plastic, or polyvinyl and having a first end 12a and a second end 12b. The internal diameter of the first end 12a of second hollow frustum 12 is larger than the external diameter of the second end 12b of first hollow frustum 12. First hollow frustum 11 is securely attached to second hollow frustum 12 at the first end 11a of first hollow frustum 11 and at the first end 12a of second hollow frustum 12 creating a barrel-shape shock isolator having an enclosed cavity. Located in the second end 11b of first hollow frustum 11 is a first set of mounting plate engaging threaded inserts 13. Similarly located in the second end 12b of second hollow frustum 12 is a second set of mounting plate engaging threaded inserts 14.

Figure 2:
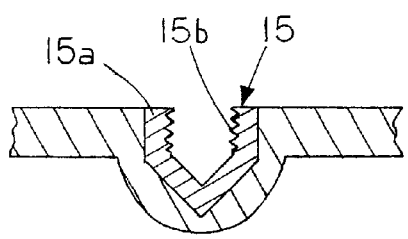
FIG. 2 is a cross-sectional view of a threaded insert of FIG. 1.

FIG. 2 is a cross-sectional view of a threaded insert 15 from second set of threaded inserts 14 of FIG. 1. Threaded inserted 15 has a rigid side wall 15a having a thread 15b which provides for a secure mounting plate engagement.

Figure 3:
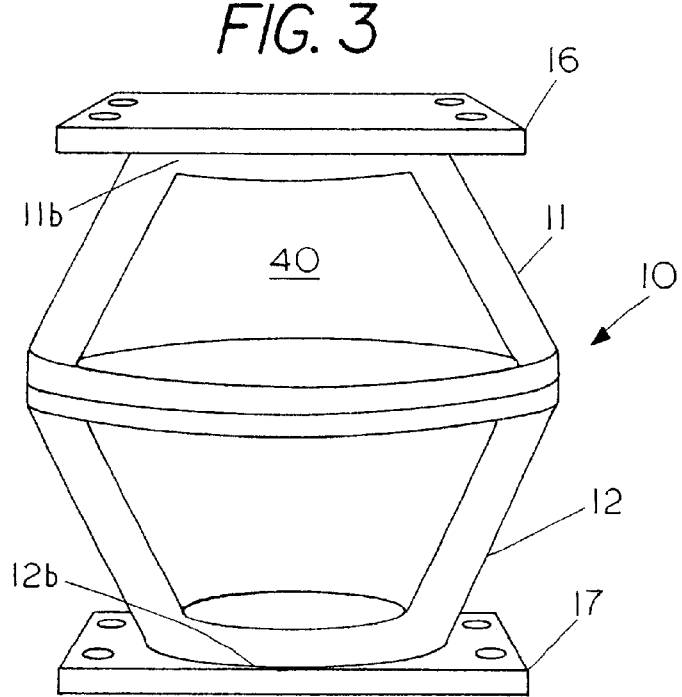
FIG. 3 is a perspective view showing the barrel elastomer mount of the present invention with mounting plates attached.

FIG. 3 is a perspective view showing the barrel elastomer mount 10 of the present invention. Securely attached to the second end 11b of first frustum 11 is a first mounting plate 16. First mounting plate 16 allows barrel elastomer mount 10 additional support of a housing by providing additional surface area for barrel elastomer mount 10 to engage the housing surface. Securely attached to the second end 12b of the second frustum 12 is a second mounting plate 17. Mounting plate 17 helps secure barrel elastomer mount 10 to a floor surface by providing barrel elastomer mount 10 with additional floor surface area to engage the support surface. Mounting plates 16 and 17 can be attached to barrel elastomer mount 10 by a plurality of methods such as through the use of threaded inserts, as shown in FIG. 2, or by bonding mounting plates 16 and 17 to barrel elastomer mount 10. Located in the interior of barrel elastomer mount 10 is a mount cavity 40 shown by a dashed line.

Figure 4:
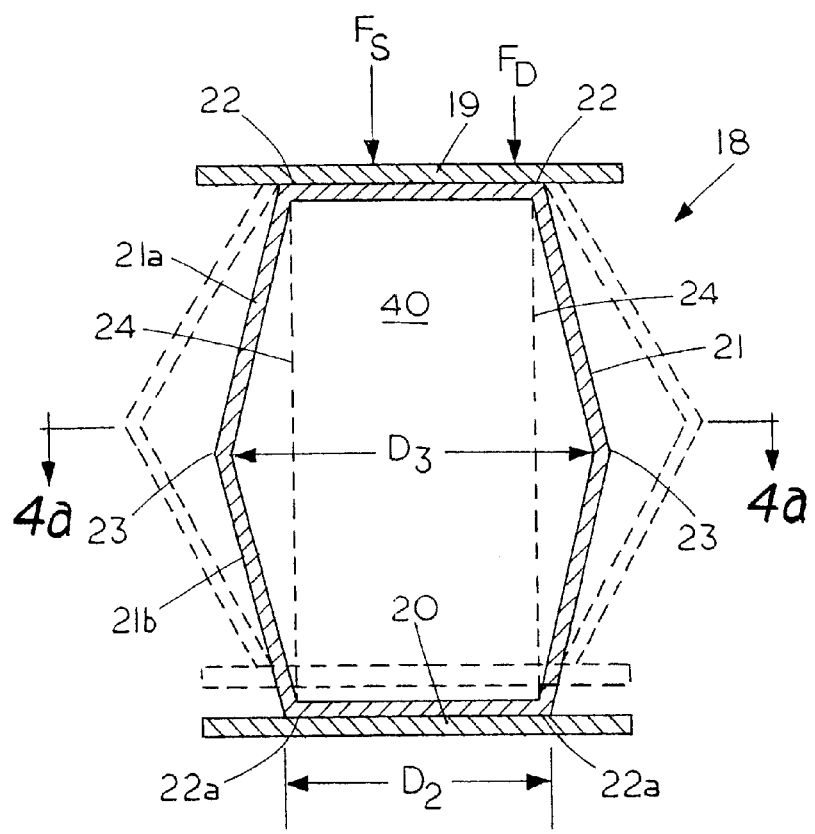
FIG. 4 is a partial cross-section view showing a barrel elastomer mount under a static force and a dynamic force.

FIG. 4 is a cross-section view showing a barrel elastomer mount 18 of the present invention. Barrel elastomer mount 18 has a first end 19 with a mounting plate 25a (FIG. 5) for engaging and supporting a housing such as cabinets and a second end 20 with a mounting plate 25b (FIG. 5) for engaging a support surface. Extending between first end 19 and second end 20 of barrel elastomer mount 18 is an elastomer wall 21 having an upper portion 21a in the shape of a first hollow frustum and a lower portion 21b in the shape of a second hollow frustum with upper portion 21a and lower portion 21b joined circumferentially at a midpoint between ends 19 and 20 which is identified by reference numeral 23. Ends 19 and 20 combine with elastomer wall 21 to form a closed cavity 40. The end 19 of barrel mount 18 has an outside or external diameter designated by $D_2$ and the ends of barrel mount 18 has an inside or internal diameter designated by $D_1$ with the thickness of the elastomer wall designated by "t". The inside diameter of elastomer wall 21 at midpoint between ends 19 and 20 is designated by $D_3$. A feature of the present invention is that the inside or internal diameter $D_3$ of barrel elastomer mount 18 at a point between the two ends 19 and 20 is equal or greater than the outside or external diameter $D_2$ of the ends of the barrel mount 18. By having the internal diameter $D_3$ equal or greater than the external diameter $D_2$ of either end 19 or $D_1$ of end 20 eliminates a direct compressive path through wall 2 1. Consequently, a force to ends 19 and 20 is absorbed by an outward radial expansion of wall 20 rather than by a direct compressive path through elastomer wall 21. As the elastomer wall 21 extends completely around the elastomer mount the elastomer material wall 21 provides circumferential tension resistance to the diametrical expansion of elastomer wall 21 as well as internal shear and tension resistance as elastomer wall 21 bends outward. Although the maximum circumference 23 is located at the vertical midpoint of barrel elastomer mount 18 of FIG. 4, the location of the maximum circumference can vary in alternative embodiments of barrel elastomer mount.

As shown in FIG. 4, under a static force, the maximum diameter $D_3$ of wall 21 is greater than the outside diameter by an amount 2x, where x has a distance equal or greater than 0. The feature of x having a distance equal or greater than zero (i.e. $D_3-D_2 \geq 0$) prevents wall 21 from providing a direct compressive axis, consequently the wall 21 expands radially outward to provide tension and shear resistance when dynamic forces are applied to mount 18.

The dashed lines in FIG. 4 indicates the position of wall 21 in response to force on ends 19 and 20. As shown in FIG. 4, under a dynamic force, wall 21 expands or bows out, and at a maximum circumference 23, wall 21 is radially displaced a distance $\Delta x$. Thus bowed wall 21 creates a further offset in the compressive path while at the same time providing shear and tension resistance when dynamic forces, such as shocks or vibrations, are applied to barrel elastomer mount 18.

Figure 4A:
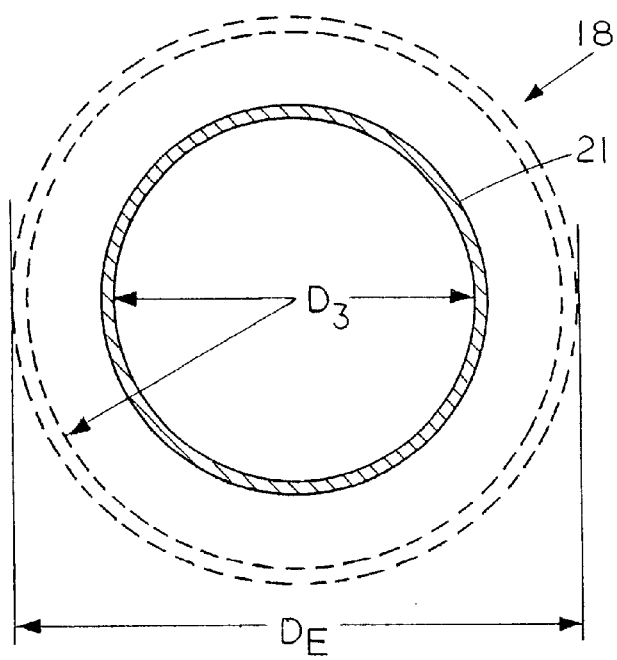
FIG. 4a shows a cross-sectionals view of FIG. 4 taken along lines 4a—4a showing the wall of the barrel elastomer mount under a static force and a dynamic force.

FIG. 4a shows a cross-sectionals view of FIG. 4 taken along lines 4a—4a showing wall 21 of barrel elastomer mount 18 under a static force and a dynamic force with the dashed lines indicating wall 21 in a radially displaced position and at an expanded diameter $D_e$. Under a static force the maximum circumference 23 of barrel elastomer mount 18 has a diameter $D_3$. When dynamic forces, such as shock or vibrations, are applied to barrel elastomer mount 18 it results in a compression of wall 21 and expansion of maximum circumference 23 of barrel elastomer mount 18 to dampen the dynamic forces by providing shear and tension resistance (the maximum circumference under a dynamic force is shown by the dashed lines). For example, under a dynamic force, maximum circumference 23 of barrel elastomer mount 18 has a diameter $D_2$, wherein $D_2$ is greater than $D_3$ which is greater than $D_2$, thus ensuring that the elastomer provides tension and shear resistance to forces on mount 18.

Figure 5:
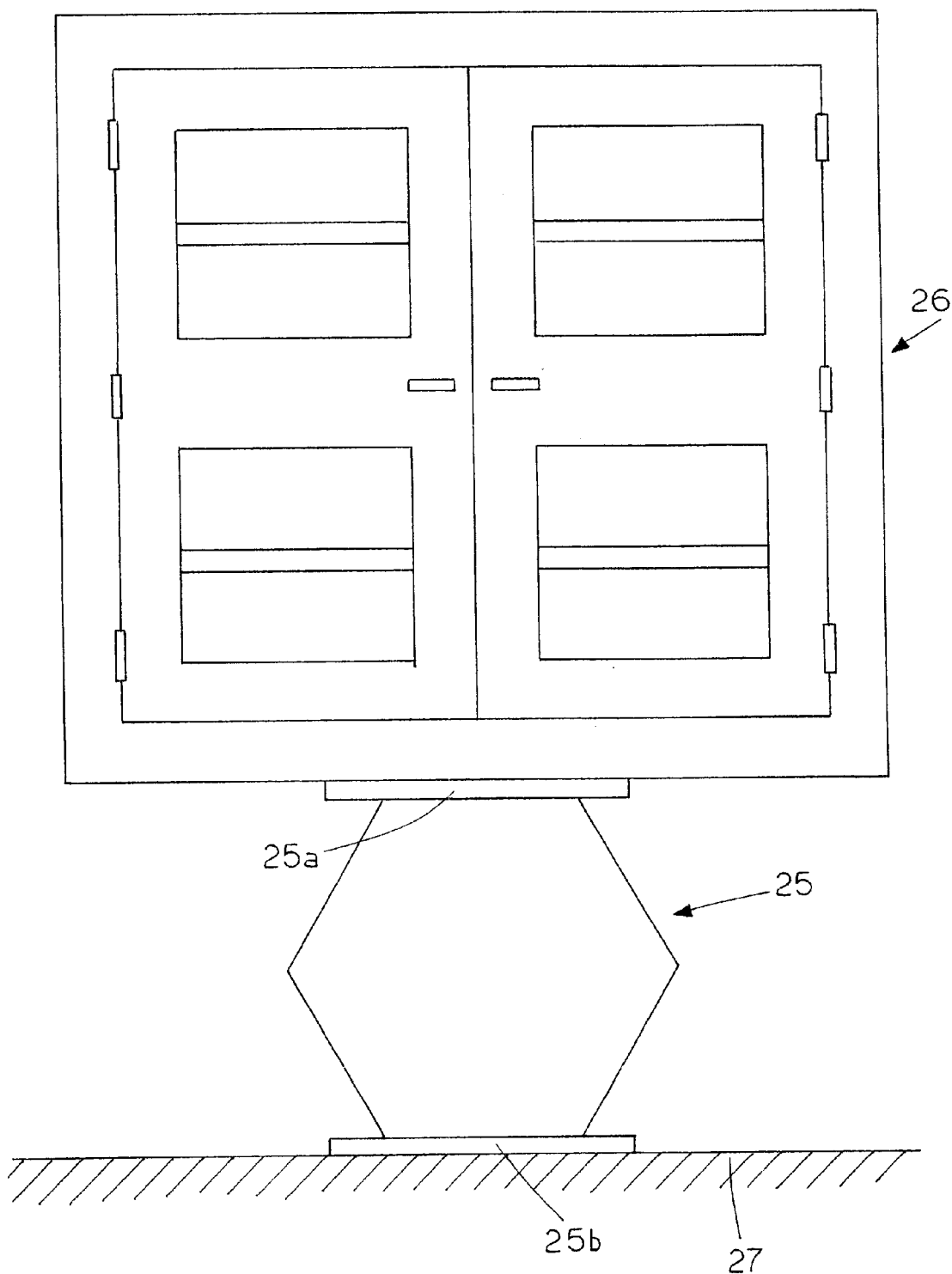
FIG. 5 shows a side view of a barrel elastomer mount supporting a cabinet housing while engaging a support surface.

FIG. 5 shows a side view of a barrel elastomer mount 25 supporting a cabinet housing 26.

As shown, cabinet housing 26 is supported by barrel elastomer mount 25 by a first end 25a of barrel elastomer mount 25 engaging the surface of cabinet housing 26 and by a second end 25b engaging a support surface 27. Although (as shown) one barrel elastomer mount can be used to support cabinet housing 26 additional barrel elastomer mounts may be used to provide a stable platform, the number of mounts vary based on the load of the cabinet housing.

Figure 6:
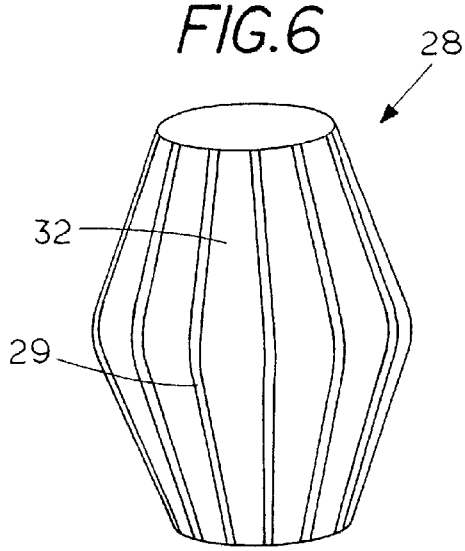
FIG. 6 is a perspective view of a barrel elastomer mount having a resilient longitudinal insert engaging the wall of the cavity.
Figure 7:
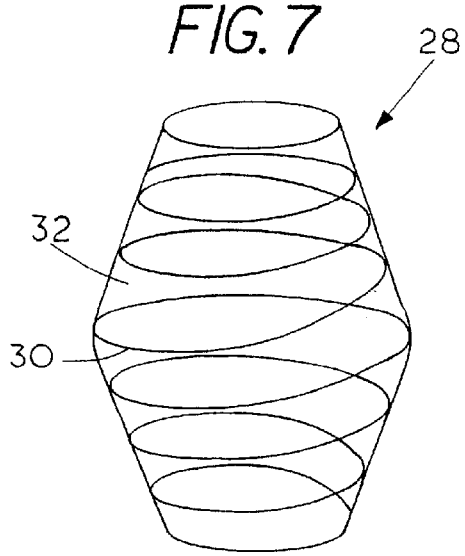
FIG. 7 is a perspective view of a barrel elastomer mount having a compression spring engaging the wall of the cavity.
Figure 8:
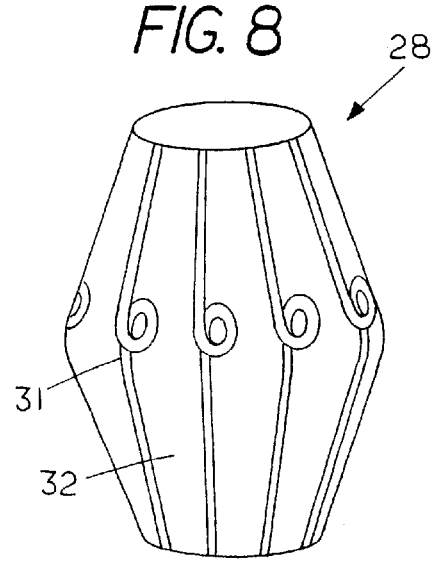
FIG. 8 is a perspective view of a barrel elastomer mount having an extended coiled spring engaging the wall of the cavity.

FIG. 6, FIG. 7, and FIG. 8 all show a perspective view of a barrel elastomer mount 28 having different resilient members engaging a wall of a cavity of barrel elastomer mount 28 for changing the barrel elastomer mount's damping characteristics as well as the static support capacity of the elastomer mount. In FIG. 6 barrel elastomer mount 28 has a set of longitudinal resilient inserts 29 engaging the walls 32 of the barrel elastomer mount 28 to thereby increase the resistance to compression of mount 28. In FIG. 7, barrel elastomer 28 has a compression spring 30 engaging the wall 32 of barrel elastomer mount 28, which also increases the resistance of compression of mount 28. Similarly, in FIG. 8, barrel elastomer 28 has a set of extended coiled springs engaging the wall 32 of barrel elastomer mount 28. The various types of resilient members shown in barrel elastomer mount 28 provide a user the option of selecting the best way to increase the compressional resistance of barrel elastomer mount 28 for a particular application.

Figure 9:
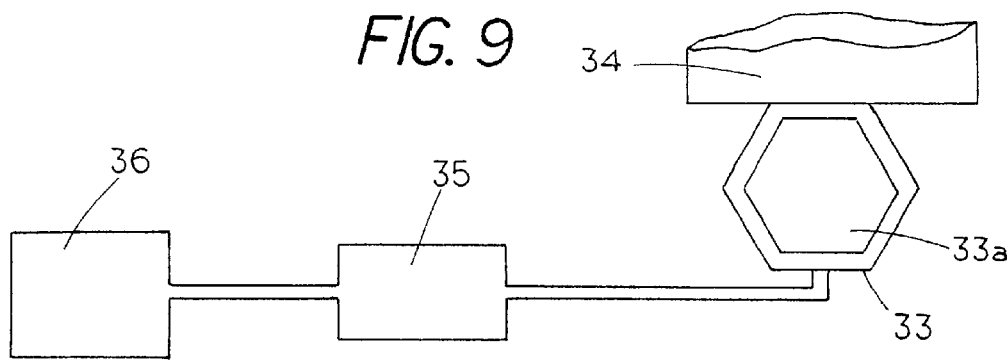
FIG. 9 is a partial schematic diagram showing a vibration control system using a barrel elastomer mount.

FIG. 9 shows a partial schematic diagram of a vibration control system using barrel elastomer mount 33. Barrel elastomer mount 33 is shown supporting a housing 34. Barrel elastomer mount 33 is connected to a controller 35 which regulates the amount of fluids that enters or escapes from the cavity 33a of barrel elastomer mount 33. The fluid in cavity 33a is under pressure $P_3$. Controller 35 can either be an automatic or a manual regulator, depending on the needs of the user. Also connecting to controller 35 is a fluid supply chamber 36 which contains a fluid for transfer to and from cavity 33a of barrel elastomer mount 33. The type of fluid in fluid supply chamber 36 can be a liquid, a gas, or both. The use of different pressures can alter the damping characteristics. For example, increasing the pressure $P_1$ can alter both the damping and supporting characteristics of the isolator.

The present invention includes a method of damping dynamic forces comprising: (1) forming a hollow barrel elastomer mount 10 from a first hollow frustum 11 composed of an elastomer and a second hollow frustum 12 composed of an elastomer; (2) placing a first mounting plate 15 on end 12b of the barrel elastomer mount 10 and placing a second mounting plate 17 on the end 11b of the barrel elastomer mount 10; (3) securing the first mounting plate to a first member such as a cabinet housing; (4) securing the second mounting plate to a second member such as a support surface to provide for support of the barrel elastomer mount.

If desired one can change the damping characteristic of the barrel elastomer mount by placing a resilient member, such as a compression spring 30, a longitudinal resilient insert 22, or an extended coiled spring 31 to the barrel elastomer mount.

We claim:

1. A barrel elastomer mount comprising:
   a. a first hollow frustum composed of an-elastomer, said first hollow frustum having a first end middle area open to said first hollow frustum, and a second solid end not open to said first hollow frustum, the first end of said first hollow frustum having a diameter larger than a diameter of said second end of said first hollow frustum; and
   b. a second hollow frustum composed of an elastomer, said second hollow frustum having a first end middle area open to said second hollow frustum, and a second solid end not open to said second hollow frustum, the first end of said second hollow frustum having a diameter larger than a diameter of said second end of said second hollow frustum, the first end of the first hollow frustum being merged with the first end of the second hollow frustum to create an enclosed cavity.

2. The barrel elastomer mount of claim 1 including a first mounting plate secured to the second end of said first hollow frustum and a second mounting plate secured to the second end of said second hollow frustum.

3. The barrel elastomer mount of claim 1 wherein the enclosed cavity contains a compression support to an article supported by said barrel elastomer mount.

4. The barrel elastomer mount of claim 1 including a plurality of spaced apart resilient members adjacent the wall of said mount and extending between said second ends of said first and second hollow frustums to provide additional compressive support.

5. The barrel elastomer mount of claim 1 including a first mounting plate securely bonded to the second end of said first hollow frustum and a second mounting plate securely bonded to the second end of said second hollow frustum.

6. The barrel elastomer mount of claim 1 including a first set of threaded inserts located at the second end of said first hollow frustum and a second set of threaded inserts located at the second end of said second frustum.

7. The barrel elastomer mount of claim 6 including a first mounting plate securely attached to the second end of said first hollow frustum at the first set of threaded inserts and a second mounting plate securely attached to the second end of said second hollow frustum at the second set of threaded inserts.

8. The barrel elastomer mount of claim 1 wherein an internal diameter ($D_3$) of the barrel elastomer mount is larger than an external diameter ($D_2$) of the barrel elastomer mount.

9. A method of damping dynamic forces comprising:
   a. forming a hollow barrel elastomer mount having an internal diameter which extends in a side-to-side condition and parallel to a first end face of the barrel elastomer mount, larger than an external diameter of either the first end face or a second end face of the barrel elastomer mount, said barrel elastomer mount formed from a first hollow frustum composed of an elastomer and a second hollow frustum composed of an elastomer;
   b. securing a base of the first hollow frustum directly to a base of the second hollow frustum;
   c. securing the first end face of the barrel elastomer mount to a first member; and
   d. securing the second end face of the barrel elastomer mount to a second member to provide for support of the barrel elastomer mount between the first member and the second member whereby a wall of said barrel elastomer provides an offset compressive path and applying dynamic forces to said barrel elastomer mount attenuates the dynamic forces through tensional resistance while simultaneously providing a compressive support.

10. The method of claim 9 including the step of placing a first mounting plate between the first end of the barrel elastomer mount and the first member and placing a second mounting plate between the second end of the barrel elastomer mount and the second member.

11. The method of claim 9 wherein the step of securing the second end of the barrel elastomer mount to a second member comprises securing the second end of the barrel elastomer mount to a support surface.

12. The method of claim 9 including a step of changing the compressive support of the barrel elastomer mount by placing a resilient member in a cavity of said barrel elastomer mount.

13. The method of claim 12 wherein the step of changing the compressive support of the barrel elastomer mount comprises placing a longitudinal resilient insert in the cavity of said barrel elastomer mount.

14. A method of damping dynamic forces comprising:
   forming a hollow barrel elastomer mount having an internal diameter larger than an external diameter of either ends of the barrel elastomer mount from a first hollow frustum composed of an elastomer and a second hollow frustum composed of an elastomer;
   securing the first end of the barrel elastomer mount to a first member;
   securing the second end of the barrel elastomer mount to a second member to provide for support of the barrel elastomer mount between the first member and the second member whereby a wall of said barrel elastomer provides an offset compressive path and applying dynamic forces to said barrel elastomer mount attenuates the dynamic forces through tensional resistance while simultaneously providing a compressive support; and
   changing the compressive support of the barrel elastomer mount by placing a compression spring in a cavity of said barrel elastomer mount.

15. A method of damping dynamic forces comprising:
   forming a hollow barrel elastomer mount having an internal diameter larger than an external diameter of either ends of the barrel elastomer mount from a first hollow frustum composed of an elastomer and a second hollow frustum composed of an elastomer;

securing the first end of the barrel elastomer mount to a first member;

securing the second end of the barrel elastomer mount to a second member to provide for support of the barrel elastomer mount between the first member and the second member whereby a wall of said barrel elastomer provides an offset compressive path and applying dynamic forces to said barrel elastomer mount attenuates the dynamic forces through tensional resistance while simultaneously providing a compressive support; and changing the compressive support of the barrel elastomer mount by placing an extended coiled spring in a cavity of said barrel elastomer mount.

* * * * *